(No Model.) 7 Sheets—Sheet 4.
J. M. & O. A. GALE.
MACHINE FOR GRADING AND ASSORTING LEAF TOBACCO.
No. 569,189. Patented Oct. 13, 1896.
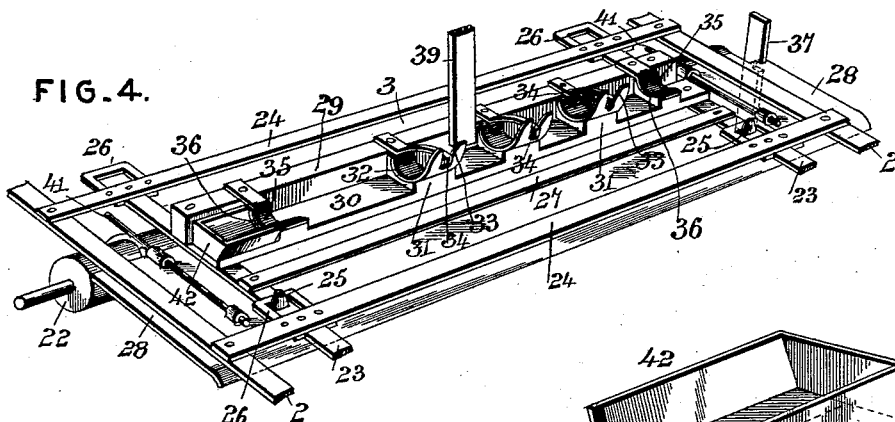
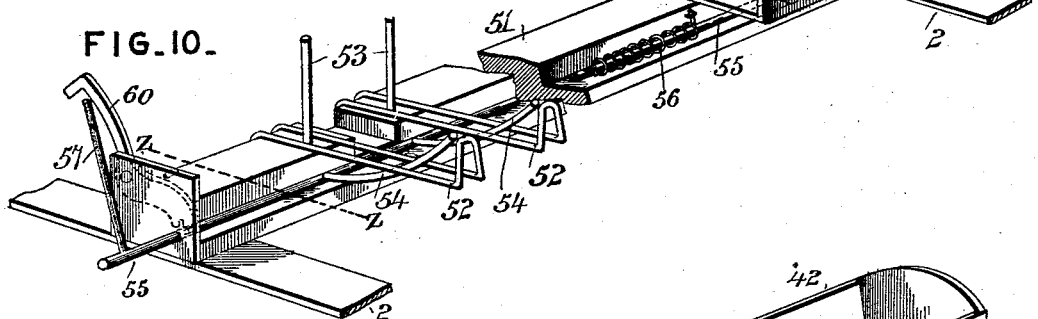
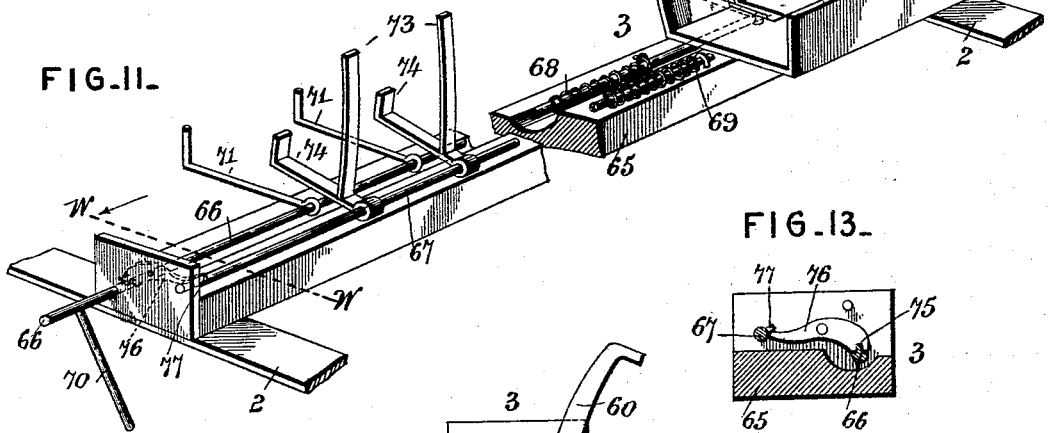
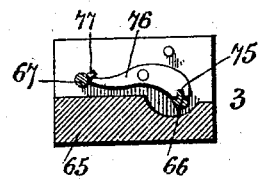
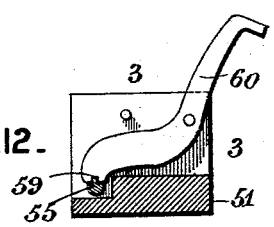
Witnesses
Jas. K. McCathran
V. B. Hillyard
Inventors
John M. Gale
Oscar A. Gale
By their Attorneys,
C. A. Snow & Co.

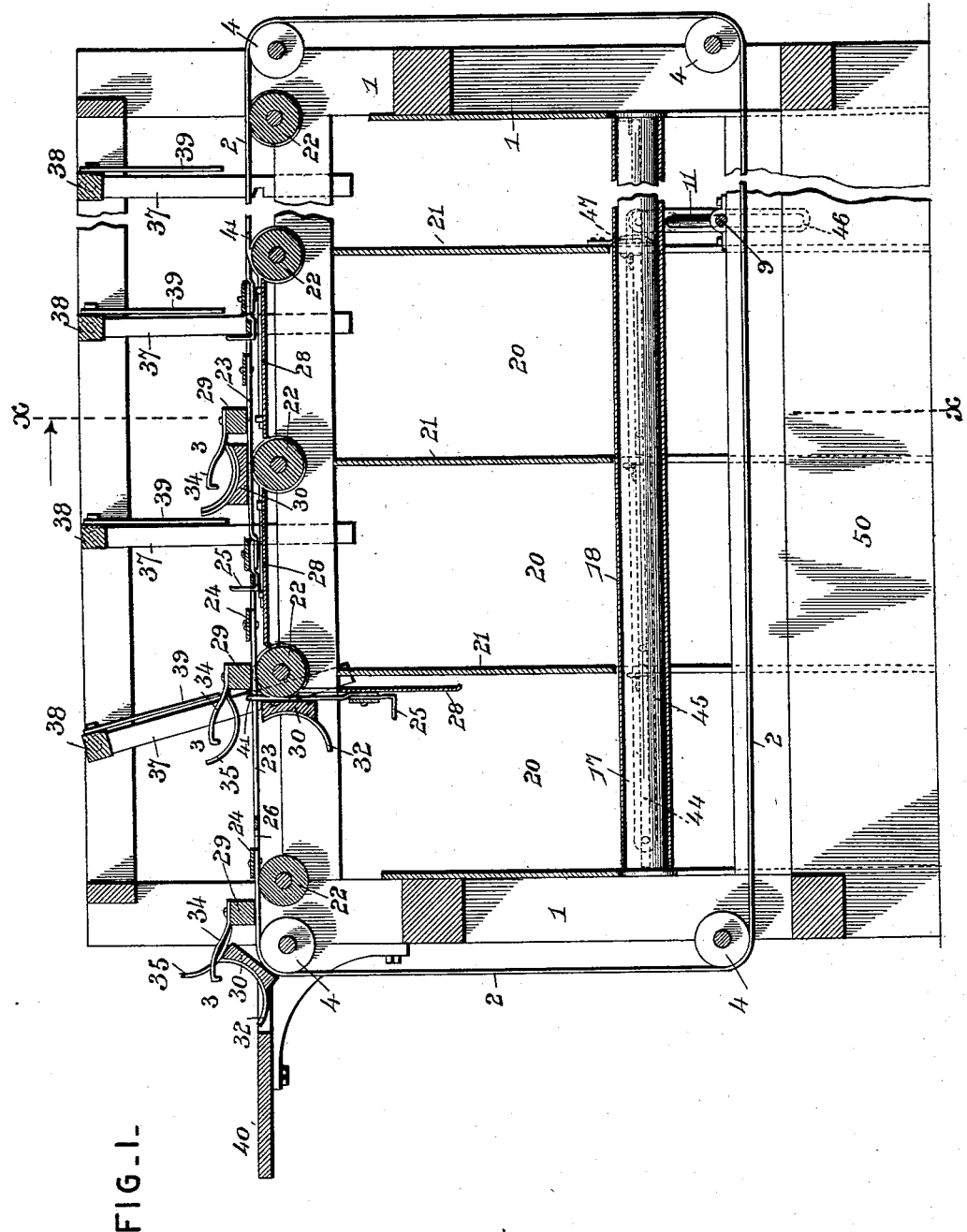

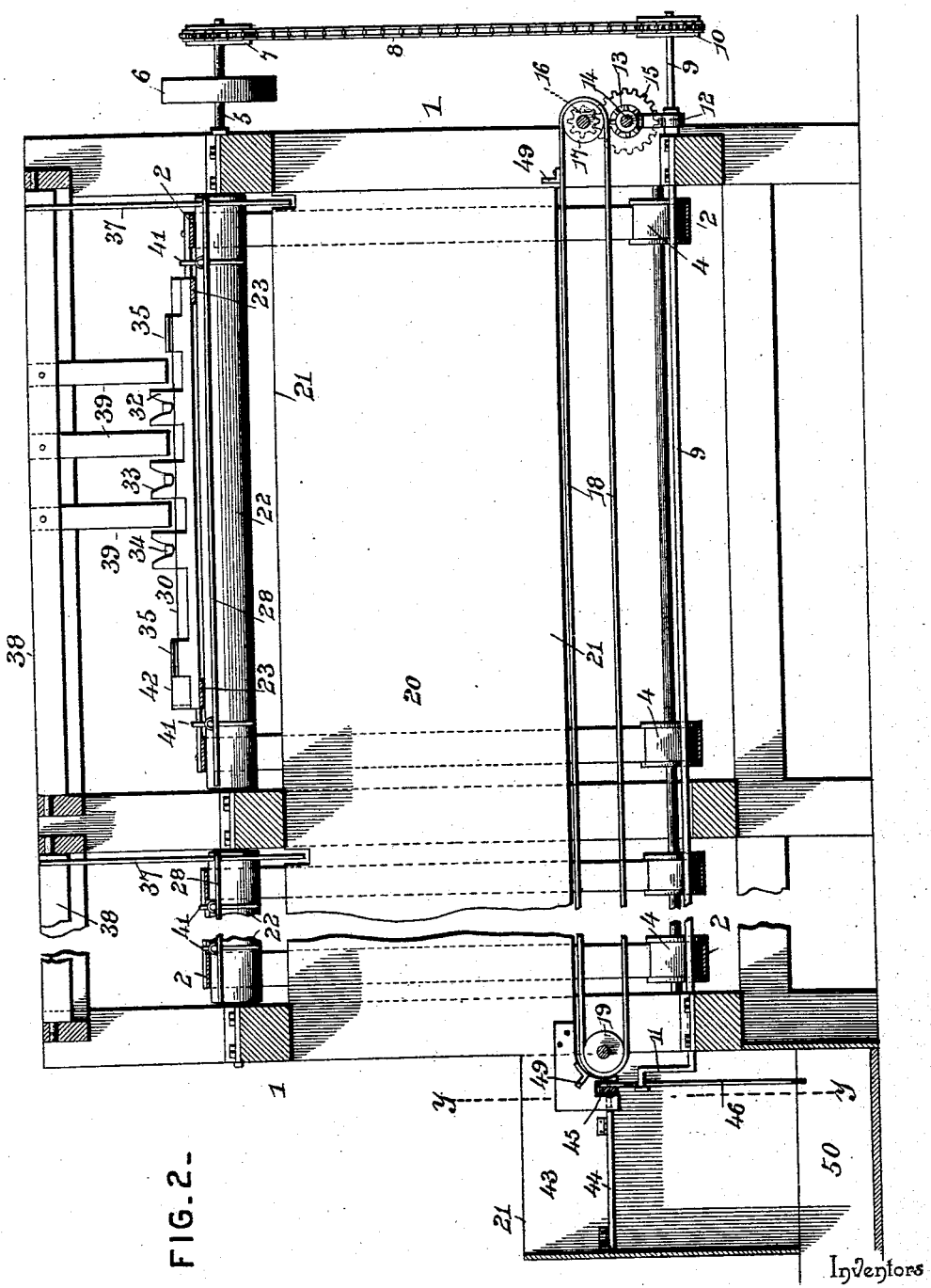

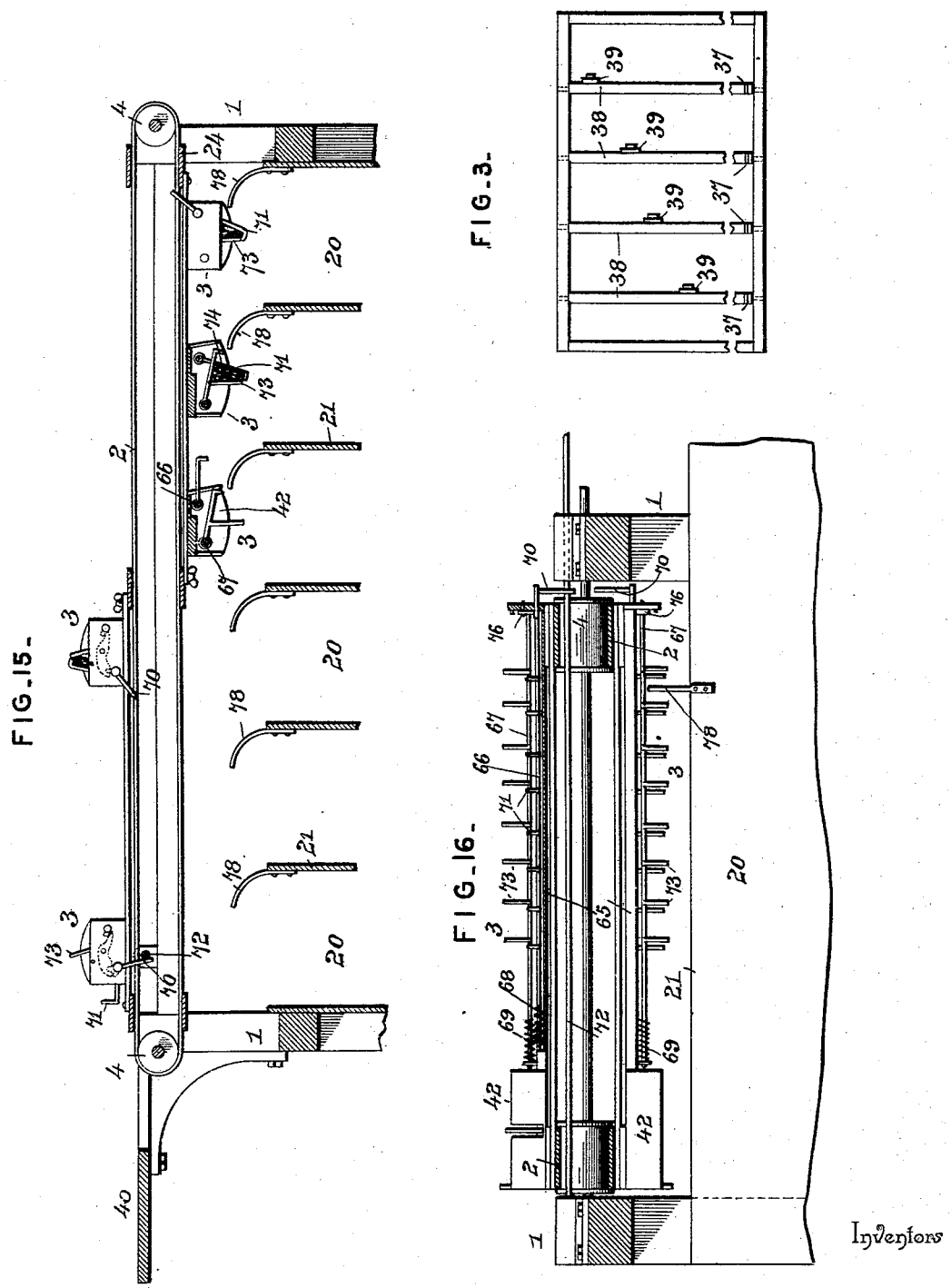

(No Model.) 7 Sheets—Sheet 5.
J. M. & O. A. GALE.
MACHINE FOR GRADING AND ASSORTING LEAF TOBACCO.
No. 569,189. Patented Oct. 13, 1896.
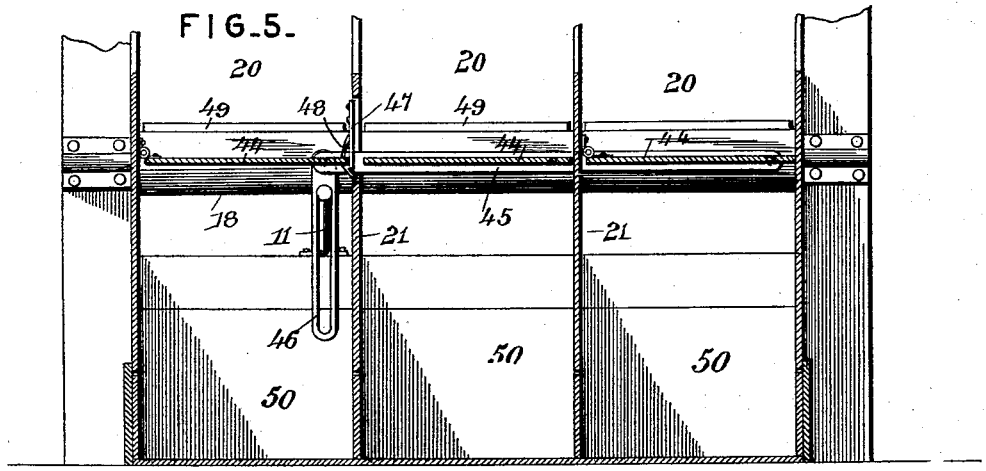
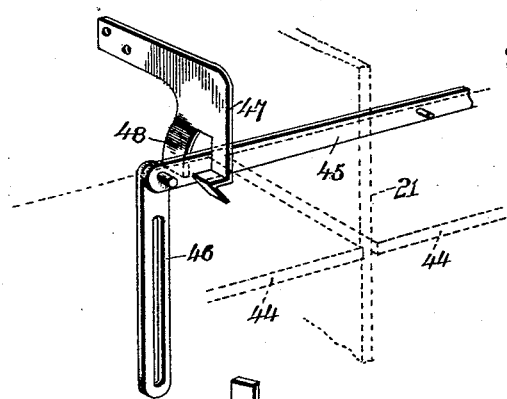
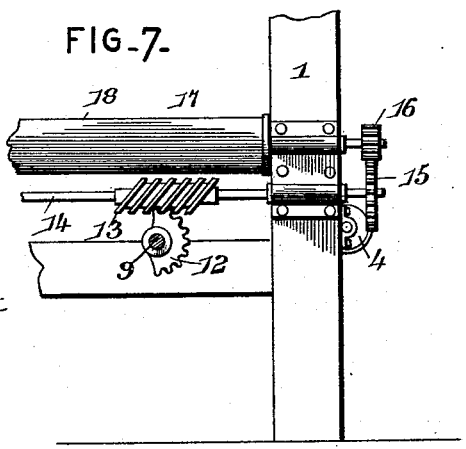
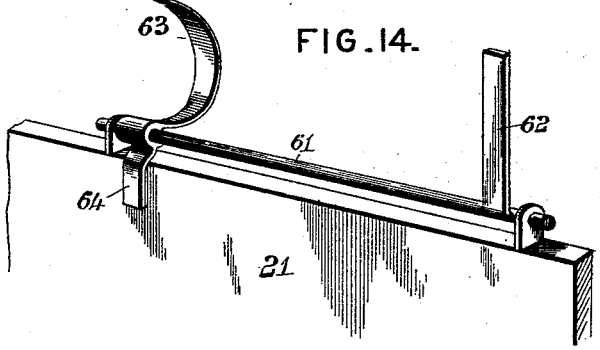
Witnesses
Jas. K. McCathran
U. B. Hillyard
Inventors
John M. Gale
Oscar A. Gale
By their Attorneys,
C. A. Snow & Co.
THE NORRIS PETERS CO., PHOTO-LITHO., WASHINGTON, D. C.

(No Model.) 7 Sheets—Sheet 6.
J. M. & O. A. GALE.
MACHINE FOR GRADING AND ASSORTING LEAF TOBACCO.
No. 569,189. Patented Oct. 13, 1896.
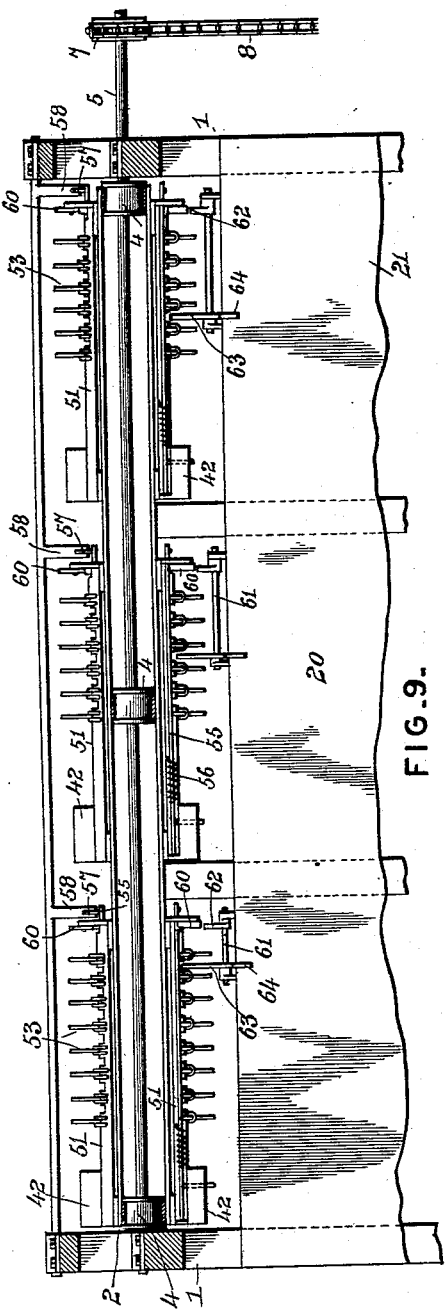
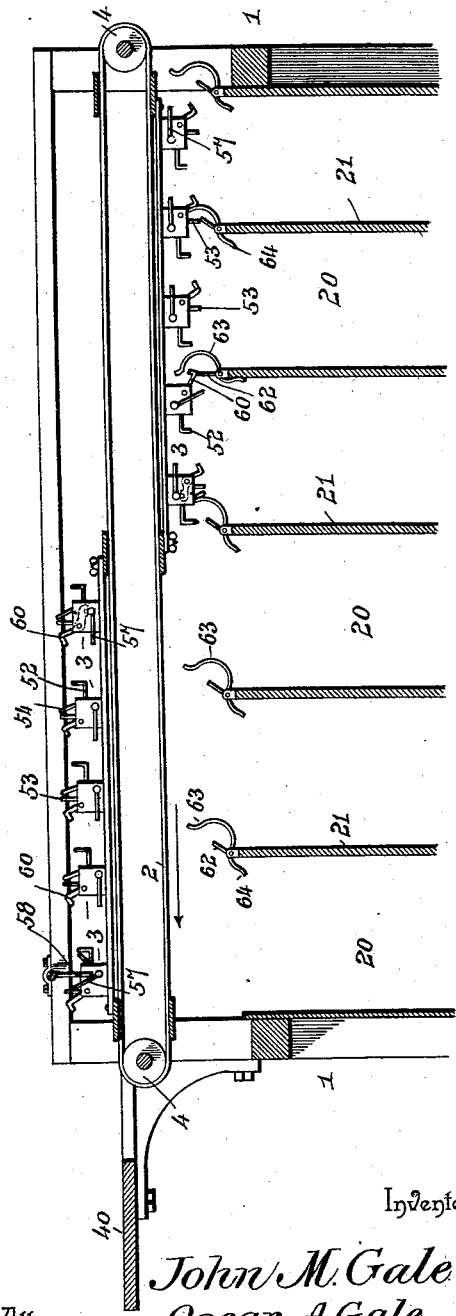
Witnesses
Jas. K. McCathran
V. B. Hillyard.
By their Attorneys,
Inventors
John M. Gale
Oscar A. Gale
C. A. Snow & Co.

(No Model.) 7 Sheets—Sheet 7.
J. M. & O. A. GALE.
MACHINE FOR GRADING AND ASSORTING LEAF TOBACCO.
No. 569,189. Patented Oct. 13, 1896.
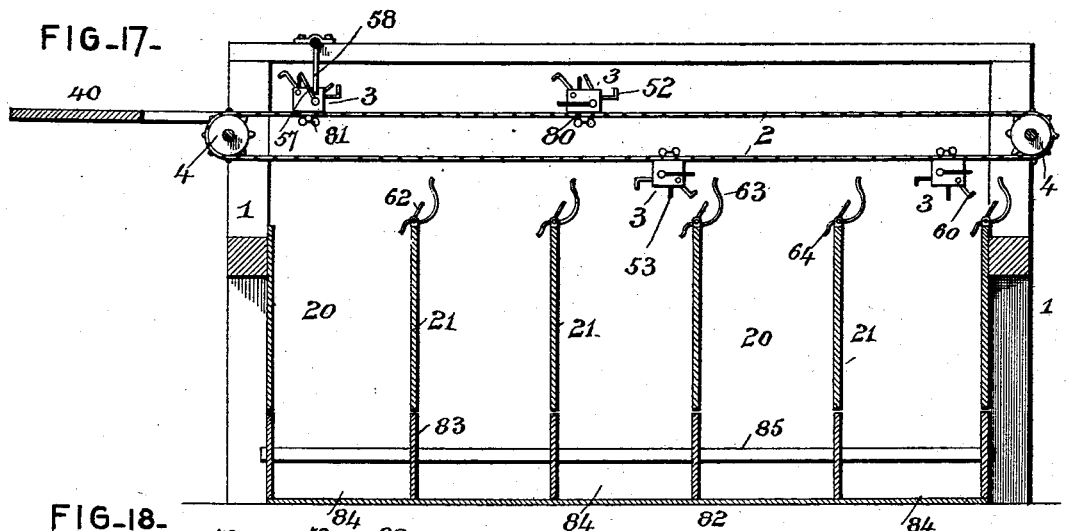
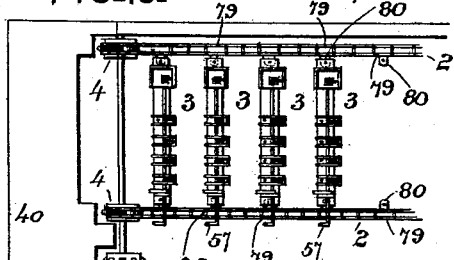
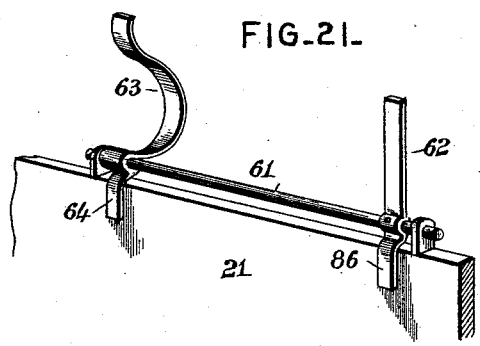
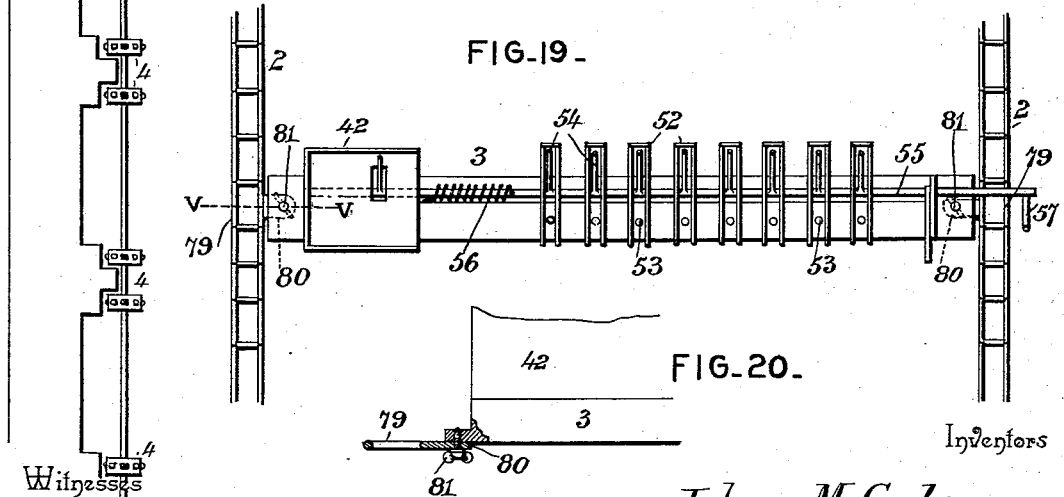
Witnesses
Jas. K. McCathran
V. B. Hillyard.
Inventors
John M. Gale
Oscar A. Gale
By their Attorneys,
C. A. Snow & Co.
THE NORRIS PETERS CO., PHOTO-LITHO., WASHINGTON, D. C.

UNITED STATES PATENT OFFICE.

JOHN M. GALE, OF EATON, AND OSCAR A. GALE, OF WEST ALEXANDRIA, OHIO.

MACHINE FOR GRADING AND ASSORTING LEAF-TOBACCO.

SPECIFICATION forming part of Letters Patent No. 569,189, dated October 13, 1896.

Application filed September 19, 1895. Serial No. 563,021. (No model.)

*To all whom it may concern:*

Be it known that we, JOHN M. GALE, residing at Eaton, and OSCAR A. GALE, residing at West Alexandria, in the county of Preble, State of Ohio, citizens of the United States, have invented a new and useful Machine for Grading and Assorting Leaf-Tobacco, of which the following is a specification.

This invention aims to provide machinery for assorting leaves of tobacco into lengths of approximately the same size and gathering the leaves of about equal length into separate compartments from which they are removed from time to time either by an attendant or automatically by mechanical appliances. This operation has been generally performed by hand, which is necessarily slow and tedious and requires the services of a number of pickers and a comparatively large space for their accommodation.

By the present invention the leaves of tobacco are fed one at a time to the machine, and the latter assorts, grades, and places together leaves of about the same length, thereby economizing space and facilitating the assorting process.

Other objects, such as appertain to machines of this character, will suggest themselves to one skilled in the art as the nature of the invention is better understood, and to this end the improvement consists of certain novel features, details of construction, and combinations of parts, which hereinafter will be more fully illustrated, described, and claimed.

In the drawings, which illustrate an adaptation and embodiment of the invention, Figure 1 is a vertical longitudinal section of a machine for carrying out the principles of the present invention. Fig. 2 is a transverse section thereof about on the line X X of Fig. 1, looking to the right, as indicated by the arrow. Fig. 3 is a top plan view, on a reduced scale, showing the progressive arrangement of the trips for releasing the leaves of tobacco from their holders. Fig. 4 is a detail perspective view of a leaf-holder and the drop-table acting in conjunction therewith. Fig. 5 is a detail section on the line Y Y of Fig. 2, looking to the right, and showing the parts for resetting and supporting the bottoms of the extension-compartments into which the assorted leaves are received. Fig. 6 is a detail perspective view of the spring-catch and a portion of the bar for connecting the bottoms of the extension-compartments in series. Fig. 7 is a detail view of the actuating mechanism for the endless conveyer by means of which the assorted leaves are moved from their respective compartments into the extension-compartments. Fig. 8 is a transverse section of a modification. Fig. 9 is a longitudinal section thereof. Figs. 10 and 11 show modified forms of the leaf-holder. Fig. 12 is a cross-section on the line Z Z of Fig. 10, looking to the left. Fig. 13 is a cross-section on the line W W of Fig. 11, looking in the direction of the arrow. Fig. 14 is a detail perspective view of the form of trip illustrated in Figs. 8 and 9, showing the same on a larger scale. Fig. 15 is a longitudinal section of a further modification. Fig. 16 is a transverse section of the same. Fig. 17 is a vertical longitudinal section of a still further modification. Fig. 18 is a detail plan view of the carrier and one end support of the modification illustrated in Fig. 17. Fig. 19 is a top plan view, on a larger scale, of a leaf-holder, showing the means for connecting it to the carrier-chains. Fig. 20 is a detail section on the line V V of Fig. 19. Fig. 21 is a modified form of trip.

Referring to the drawings, the same reference-numerals indicate like parts in all the figures, and the framework for supporting the operating parts is designated by 1 and may be of any desired form to suit the style and pattern of the completed machine.

The carrier 2, bearing the leaf-holders 3, is supported upon rollers 4 at opposite ends of the framework and receives its motion from one of the said rollers 4, which is positively driven in any convenient manner.

A journal 5 of one of the rollers is extended, and a band-pulley 6 is mounted thereon to receive motion from any suitable source of power by means of a drive-belt in the usual manner, and upon this journal 5 is placed a sprocket-pinion 7, which receives a sprocket-chain 8 for transmitting motion to a lower shaft 9, which is provided with a sprocket-pinion 10, around which passes the lower end of the sprocket-chain 8. A crank 11 is formed at one end of the shaft 9, and the latter is supplied with a mutilated gear 12, which meshes with a worm-gear 13 on a shaft 14, disposed at right angles to the shaft 9, and upon which is mounted a gear-wheel 15, meshing with a pinion 16, mounted upon the journal of the roller 17, which supports one end of the endless conveyer 18, the opposite end of this conveyer being supported upon a roller 19, corresponding to the roller 17 and located at the opposite end of the framework.

A series of compartments 20 are formed by vertical partitions 21 and are closed at their lower ends by the endless conveyer 18, which forms a traveling or movable bottom therefor. The compartments 20 and the endless conveyer 18 are located between the upper and lower portions of the carrier 2, and the endless conveyer 18 travels in a direction parallel to the length of the compartments 20 and the partitions 21. A series of rollers 22 are located above the respective partitions 21 and are intended to support the upper portion of the carrier in its travel thereover, and these rollers also serve to relieve the friction incident to the passage thereover of the supports 23, to which the leaf-holders are attached.

The carrier 2 may be either an endless apron or a series of bands extending in parallelism, and when the latter are employed they will be connected by transverse slats 24, and between these slats are located the flexible supports 23, which are preferably straps and which are secured at one end to one of the slats 24, and which have hooks 25 at their free ends to engage with loops or eyes 26, attached to the adjacent slat 24. The free ends of the flexible supports 23 are braced and held in fixed relation by a connecting-bar 27. The hooks 25 have their bent ends extending at such an angle as to readily engage with and be released from the loops or eyes 26. The connecting-bar 27 is of metal and is of such mass as to insure the automatic disengagement of the hooks 25 from the loops 26 when the drop-table 28 is lowered and to cause the lowering of the supports 23, so as to discharge the leaf of tobacco clamped in the holder carried thereby.

The holder is composed of two bars or rods 29 and 30, which extend in parallelism and are attached at their ends to the flexible supports 23. The bar 30 is provided at intervals in its length with raised portions 31, which have concave seats in their upper faces, in which are fitted receivers 32, which are curved strips having notches 33 in their outer ends, in which enter the bent ends of clamping-fingers 34, which coöperate with the receivers 32, so as to retain the leaf of tobacco after the latter has been placed in the receivers 32 in the manner presently to be referred to. Retainers 35 are secured to the bar 29 near its ends, and the outer portions are curved downwardly and upwardly and fit corresponding curved seats 36 near the ends of the bar 30, so as to maintain the latter bar in proper relation when the leaf of tobacco is placed in the receivers 32. The curved ends of the retainers 35 are slightly elastic, so as to spring when the bars 29 and 30 are passing over the end or supporting rollers 4. When a holder comes into position to receive a leaf of tobacco, the bars 29 and 30 will occupy the position substantially as shown to the left in Fig. 1 and the retainers 35 will engage with the elevated edge portion of the bar 30 and hold the lower portion of the receivers 32 in an approximately horizontal position, so as to retain the leaf of tobacco supplied thereto. The instant the bar 30 passes over the roller 4 the retainers 35 will spring into the curved seats 36 and maintain the bars 29 and 30 in proper relation.

There will be a drop-table 28 for each compartment 20, and it will extend horizontally over and close the upper end of its respective compartment. The drop-tables 28 have pivotal connection at their rear edges with the respective rollers 22, and their front ends are slightly curved downwardly to facilitate the passage thereover of the leaf-holders without catching the same. These tables are supported by pendent hooks 37, which are secured at their upper ends to rocker-bars 38 and from which depend a series of trips 39, the lower ends of which project within the path of the tobacco-leaves clamped in their respective holders. These trips 39 are disposed in a progressive series, the trip nearest the front end of the machine being set to engage with the butt-end of the longest leaf and the second trip to engage with the butt-end of the next longest leaf, and so on throughout the series, so that the rearmost trip is arranged to be engaged by the butt-end of the shortest leaf. The receivers 32 are arranged at any required distance apart from a half to one inch, more or less, according to the degree of assorting and grading to be attained. The trips 39 are disposed to operate in the spaces formed between the receivers or the tobacco-clamps, so as to engage with that portion of the tobacco-leaf extending and occupying the space between the said clamps.

A table 40 is placed at the front end of the machine, and upon this is arranged the hand of tobacco to be assorted, the feeder or attendant supplying one leaf thereof at a time to the leaf-holders as the latter come into the position substantially as shown in Fig. 1. As the holder moves toward the rear end of the machine the fingers 34 will close upon the leaf of tobacco and grip the same in the receivers 32, and if the leaf is of sufficient length to engage with the first trip 39 of the series the latter will be moved and rock the attached bar 38 and withdraw the connected hook 37 from engagement with the table and permit the latter to drop, when the flexible supports 23 will likewise drop at their free ends and release the leaf of tobacco, which latter will drop into the foremost compartment 20. As the next holder moves rearwardly it will engage with rearwardly-extending projections 41, attached to the table 28, and which are in the same plane with the table and project vertically when the said table 28 is in a lowered position, and move said projections 41 from the vertical to a horizontal position, thereby elevating the drop-table, which will be supported by the hook 37 automatically engaging therewith. The flexibility of the supports 23 admits of the bar 30 tilting into a vertical position, as shown most clearly in Fig. 1, whereas the bar 29 rests upon the contiguous roller 22, thereby insuring the discharge of the tobacco-leaf into the compartment.

It must be understood that the leaves of tobacco are placed within the holders in a certain and definite position and in such relation so that their butt or stiff ends will engage with the respective trips, and this result can be attained in any desired manner, and, as shown, is effected by providing one end of the holder with an evener or gage 42, which is closed at its bottom, sides, and outer end, the leaves being placed so that their pointed ends will lie within the device 42 and touch the outer closed end thereof.

The table 40 is notched at its rear edge to admit of the passage thereby of the projecting parts of the bars 29 and 30.

The several compartments 20 will be prolonged at one side of the machine, so as to form extensions 43, which are closed by drop-bottoms 44, which are hinged or pivotally connected at one end to extensions of the partitions 21, and these drop-bottoms are connected in series by a bar 45, so that the opening and the closing of the bottoms will be in unison. A slotted link 46 has pivotal connection at its upper end with the connecting-bar 45, and the free end of the crank 11 operates in the slot of the link 46, and the purpose of these parts is to automatically close the bottoms 44 after the latter have been opened to drop the assorted and graded leaves of tobacco placed thereupon. A spring-catch 47 is arranged to engage with one of the bottoms 44 and hold the latter in closed relation, and a projection 48 is formed with the spring-catch 47 and is deflected so as to extend across the path of a bar 49, secured to the endless conveyer 18, so as to be engaged thereby and press the catch 47 to one side and withdraw it from engagement with the bottom and permit the series of bottoms to drop and deposit their burden into a receptacle 50, suitably placed to receive the same. The slot in the link 46 and the crank 11 are of such relative lengths so that when the bottoms are closed the shaft 9 can rotate without in any wise affecting the position of the said bottoms.

In the modifications the carrier 2 will be located wholly above the compartments 20, and the holders will be arranged to deliver the leaves of tobacco into the respective compartments from the under side or return portion of the carrier. Hence the trips must be disposed below the carrier, so as to engage with and release the tobacco.

The leaf-holder illustrated in Figs. 8 and 9 is shown in detail in Fig. 10 and comprises a bar 51, formed with receivers 52 and having pins 53 extending at right angles from the outer face of the bar 51, and which act in conjunction with clamping-fingers 54 to secure the leaf of tobacco in proper position. The clamping-fingers 54 are curved in their length and are attached to a rod 55, which is journaled in any approved manner in a rabbeted portion of the bar 51. A coil-spring 56 is mounted upon the rod 55, and one end is secured to the said rod and its opposite end is made fast or engages with the bar 51, so as to obtain a resistance thereagainst, and this spring serves to normally hold the clamping-fingers 54 open and away from the pins 53. One end of the rod 55 projects beyond the end of the bar 51 and is supplied with an arm 57, which engages with a suitable stop or trip 58, so as to turn the rod 55 in its bearings and clamp the tobacco-leaf between the pins 53 and the fingers 54, and a projection 59 on the rod 55 is engaged by the notched end of a pivoted catch 60, so as to hold the rod 55 against the tension of the spring 56 and the pressure of the tobacco held between the parts 53 and 54. The trip mechanism comprises a rock-shaft 61, mounted in bearings attached to the upper portion of each partition 21 and provided at one end with a stop 62 and at its opposite end with a spring-arm 63, from the butt portion of which extends a projection 64 to engage with the side of the partition and hold the stop 62 within the path of the pivoted catch 60 to engage with and release the latter from the projection 59, when the spring 56, regaining itself, will throw the clamping-fingers 54 away from the pins 53 and release the tobacco, which will drop into the proper compartment. The stops 62 of the several trip devices will be located in the same straight line to correspond with the position of the catches 60 of the leaf-holders, so as to engage therewith when thrown into proper position by the engagement of the spring-arms 63 with the butt-ends of the tobacco leaves. The spring-arms 63 will be located in a progressive series similar to the trips 39 and for a like purpose, with this difference, that instead of the spring-arms releasing the catches 60 by direct engagement therewith they serve to turn the shafts 61 so as to throw the stops 62 into proper position to engage with the catches 60 and produce the release and discharge of the leaf, as will be readily understood. The projection 64 engaging with the side of the partition sustains the stop 62 in operative position against the pressure of the pivoted catch, so as to insure the disengagement of the latter from the projection 59.

The form of leaf-holder shown in Figs. 15 and 16 is better illustrated in the enlarged detail view thereof in Fig. 11, and the same consists of a bar 65 and parallel rods 66 and 67, journaled thereto. These rods 66 and 67 are maintained and returned to a normal position by coil-springs 68 and 69, which are mounted thereupon and secured in a similar manner to the coil-spring 56. The rod 66 is extended at one end and is provided with an arm 70 and with clamping-fingers 71, the arm 70 being disposed to engage with a stop 72, so as to move the clamping-fingers 71 and clamp the leaf against the arms 73, having connection with the rod 67. Other arms 74 are disposed at right angles to the arms 73 and have rigid connection with the rod 67 and serve to receive the leaf of tobacco when the latter is placed upon the holder. The rod 66 is provided at one end with a projection 75, which is engaged by the notched end of a pivoted catch 76 to retain the clamping-fingers 71 in proper position against the tension of the spring 68. A lug 77 on the rod 67 is arranged to engage with the free end of the pivoted catch 76 to operate the latter and release it from the projection 75, thereby permitting the spring 68 to regain itself and release the tobacco, which will drop into the proper compartment. A series of trips 78 are secured to the upper portions of the partitions 21 and engage with the tobacco in the manner previously described and exert an upward pressure on the arms 74 sufficient to rock the bar 67 to bring the lug 77 in engagement with the pivoted catch 76 and disengage the latter from the projection 75 for the purpose aforesaid.

In the operation of the machine the endless conveyer 18 is actuated at intervals which are timed to correspond with the interim during which the feeder is untying and preparing a new hand of tobacco preparatory to feeding the same to the machine, and the conveyer travels a distance corresponding to the length of the compartments, so as to deposit the assorted tobacco upon the bottoms 44 of the extension-compartments 43. At or about the instant the tobacco is received upon the bottoms 44 a bar 49 of the endless conveyer will engage with the arm 48 of the spring-catch 47 and move the latter aside, so as to release and permit the bottoms to drop and deposit their load into the compartment-receptacle 50.

When the machine is constructed for a single feeder, there will be but one line of leaf-holders, but for general use the machine will be devised for a number of feeders, and to this end a series of lines or rows of leaf-holders will be provided and attached to the carrier, as shown most clearly in Fig. 8, the number of the rows of leaf-holders being dependent upon the capacity of the machine. In some instances the endless conveyer 18 will be dispensed with and the compartment-receptacle will be placed beneath the compartments 20, so as to receive the graded and assorted tobacco directly into the required compartment. It will be understood that each set or row of leaf-holders will be provided with stops and trips, so as to automatically clamp the tobacco and release the same at the proper point, substantially in the manner herein set forth.

In providing a carrier for the machine a belt of canvas, leather, or other suitable material may be employed, and in some instances sprocket-chains may be utilized to advantage, as indicated in Figs. 17, 18, and 19. Chains obviate stretching and slipping of the carrier and permit the employment of toothed rollers or sprocket-wheels, the spurs of which make positive engagement with the links of the chain-carrier. Some of the links, as 79, have laterally-extending eyes 80, to which the ends of the leaf-holders are secured in any desired manner, preferably by means of thumb-screws 81, which pass through openings in the ends of the leaf-holders and through the said eyes 80. By this construction a leaf-holder can be readily detached from the carrier for any desired purpose, and by having the carrier composed of links any one or more of the latter can be substituted by new ones when making repairs. As previously intimated, there will be as many carriers as there are operators to a machine, one operator being provided to feed each carrier.

A compartment-receptacle 82 is supplied for each carrier and operator and is placed beneath the series of vertical compartments 20, and comprises a bottom and vertical divisions 83, the latter registering with and coming beneath the vertical partitions 21 when the said compartment-receptacle is in proper position. Thus the compartments in the said receptacle correspond in number and position with the compartments 20 and receive the tobacco directly therefrom. The compartments 84 of the receptacle may be of any desired depth, usually about two feet in a full-sized machine, and their ends will be open except for one or more connecting-strips 85, which secure and maintain the vertical divisions 83 in fixed relation.

The leaf-holders may be of any desired form, and the style illustrated most clearly in Fig. 10 is the one employed in the modification shown in Figs. 17, 18, and 19, and the trip to coöperate therewith is substantially the same as that shown in Fig. 14, with the exception that the stop 62 has its heel portion extended to form a projection 86 for a purpose similar to the projection 64 and to hold the stop 62 more rigidly, thereby obviating the torsional strain upon the shaft 61 attendant upon the form of trip shown in Fig. 14. Obviously the trip shown in Fig. 21 can be substituted for the trip shown in Fig. 14 and used in a similar relation.

The machine operates in precisely the same manner as the forms shown in Figs. 9 and 15. Hence a repetition of the same is not deemed necessary.

From what has been said it is manifest that the capacity of the machine can be varied and that it can be differently organized, according to the particular requirement. Therefore it is obvious that various changes in the form, proportion, and the minor details of construction may be resorted to without departing from the principle or sacrificing any of the advantages of this invention.

Having thus described the invention, what is claimed as new is—

1. In a machine for assorting and grading leaf-tobacco, the combination of a carrier, leaf-holders attached to the carrier, and trips arranged to extend within the path of the tobacco-leaf so as to be actuated thereby and release the tobacco from its holder, substantially in the manner set forth for the purpose described.

2. In a machine for assorting and grading leaf-tobacco, the combination of a carrier, leaf-holders attached to the carrier, and a series of trips disposed in progressive relation and extending within the path of the tobacco so as to be actuated thereby to effect a release of the tobacco from its holder, substantially as and for the purpose set forth.

3. In a machine for assorting and grading leaf-tobacco, the combination of a carrier, a series of leaf-holders attached thereto, clamping devices provided at intervals in the length of the leaf-holders and spaced at proper intervals apart, and a number of trips disposed in a progressive series and adapted to operate in the spaces between the clamping devices and be actuated by the tobacco so as to effect a release of the latter from their holders, substantially as specified.

4. In a machine for assorting and grading leaf-tobacco, the combination of a carrier, a leaf-holder attached to the carrier and provided with an evener or gage and with a series of clamping devices spaced at proper intervals apart, and a series of trips disposed in progressive relation and extending within the path of the tobacco so as to be actuated thereby and release the tobacco from the holders, substantially as set forth for the purpose described.

5. In a machine for assorting and grading leaf-tobacco, the combination of a carrier, leaf-holders attached to the carrier and provided with means for receiving the tobacco, clamping-fingers for securing the tobacco, and a progressive series of trips arranged to be actuated by the tobacco to effect a release thereof from the holders, substantially as and for the purpose set forth.

6. A machine for grading and assorting leaf-tobacco, comprising a series of compartments, a carrier disposed to travel over the said compartments, leaf-holders attached to the carrier, and trips, one for each compartment, and disposed in a progressive series and adapted to be actuated by the tobacco so as to release the latter and effect its deposition into the proper compartment, substantially as described for the purpose set forth.

7. A machine for assorting and grading leaf-tobacco, comprising a series of compartments, a carrier adapted to move over the compartments and provided with a series of leaf-holders, a series of trips disposed in progressive relation and arranged to engage with the tobacco and effect a deposition of the same into the proper compartment, and a conveyer forming a bottom to the compartments and adapted to receive and support the tobacco deposited therein and to discharge the same from the compartments, substantially in the manner set forth for the purpose specified.

8. In a machine for assorting and grading leaf-tobacco, the combination with a series of compartments, means for dropping the tobacco into the proper compartments, and a conveyer forming a bottom to the compartments, of extensions at one end of the compartments, bottoms closing the extension-compartments and adapted to drop at one end, means for connecting the bottoms in series, and a catch for supporting the said bottoms and automatically actuated by the conveyer to trip and release the said bottoms, substantially as set forth for the purpose described.

9. In a machine for assorting and grading leaf-tobacco, the combination with a series of compartments, means for depositing the tobacco therein, and a conveyer forming a bottom to the compartments, of extension-compartments at one side of the machine and forming a continuation of the aforesaid compartments, drop-bottoms closing the extension-compartments and connected in series, a catch for supporting the drop-bottoms in closed relation, and a bar attached to the conveyer and adapted to disengage the catch from the bottoms, substantially as and for the purpose set forth.

10. In a machine for assorting and grading leaf-tobacco, the combination with a series of compartments, provisions for supplying the compartments with tobacco of substantially equal length, and a conveyer forming a bottom to the said compartments, of extension-compartments at one side of the machine and in line with the respective aforesaid compartments, drop-bottoms for closing the extension-compartments and connected in series, a spring-catch having an offstanding portion and adapted to hold the compartments in closed relation, a bar attached to the conveyer and adapted to engage with and release the catch from the said drop-bottoms, a slotted link operatively connected with the drop-bottoms, and a rotating shaft having a crank operating in conjunction with the said slotted link to close the drop-bottoms after they have discharged their load, substantially in the manner set forth for the purpose described.

11. In a machine for assorting and grading leaf-tobacco, the combination with a series of compartments, and means for depositing tobacco of substantially equal length into the proper compartments, of an endless conveyer common to and forming a bottom for all the compartments, and actuating mechanism for intermittently operating the said conveyer, as and for the purpose set forth.

12. In a machine for assorting and grading leaf-tobacco, the combination with a series of compartments, means for depositing the tobacco therein in assorted lengths, and a conveyer forming a bottom to the compartments, of extension-compartments forming continuations of the respective aforesaid compartments, drop-bottoms for closing the extension-compartments and connected in series, a slotted link operatively connected with the drop-bottoms, a power-driven shaft having a crank operating in conjunction with the slotted link, and actuating mechanism between the said power-driven shaft and the conveyer for intermittently operating the latter, substantially in the manner set forth for the purpose described.

13. In a machine for assorting and grading leaf-tobacco, the combination of a series of compartments, an endless carrier disposed to travel over the said compartments, supports bearing leaf-holders permanently attached at one end to the carrier and having their opposite ends free and adapted to drop, drop-tables extending over the upper ends of the aforesaid compartments to sustain the said leaf-holder supports, hooks sustaining the drop-tables in a normal position, and trips operatively connected with the hooks and adapted to be actuated by engagement with the tobacco in the leaf-holders so as to withdraw the hooks from engagement with the drop-tables, substantially in the manner and for the purpose specified.

14. In a machine for assorting and grading leaf-tobacco, the combination of a series of compartments, an endless carrier provided with leaf-holders which are adapted to drop, a series of rollers for the upper portion of the carrier to travel over, drop-tables for supporting the leaf-holders in their travel over the compartments, hooks for sustaining the drop-tables in a normal position, trips operatively connected with the hooks and actuated by the tobacco clamped in the leaf-holders to automatically disengage the hooks from the drop-tables, and projections extending from the rear edges of the drop-tables to be engaged by a portion of the endless carrier so as to automatically reset the drop-tables, substantially in the manner set forth for the purpose specified.

15. In a machine for assorting and grading leaf-tobacco, the combination of an endless conveyer, leaf-holder supports having permanent attachment at one end to the conveyer and formed with hooks at their opposite end, and eyes to be automatically engaged by the said hooks, as and for the purpose set forth.

16. A carrier for the purposes set forth, in combination with flexible supports, two bars disposed in parallelism and attached to the flexible supports, receivers secured to one bar, and clamping-fingers attached to the other bar to coöperate with the receivers, substantially in the manner set forth for the purpose described.

17. In combination, a carrier, flexible supports, two bars extending in parallelism, receivers attached to one bar and having their outer ends notched, and clamping-fingers secured to the other bar and having their outer ends bent and arranged to act in conjunction with the notched ends of the receivers, as and for the purpose specified.

18. In combination, a carrier, flexible supports, two bars extending in parallelism and having attachment with the said supports, receivers provided on one bar, clamping-fingers secured to the opposite bar and arranged to coöperate with the receivers, and spring-retainers attached to one of the bars and adapted to exert a pressure upon the opposite bar to maintain the said bars in proper relation, substantially in the manner set forth for the purpose described.

19. In combination, a carrier, flexible supports, two bars secured to the flexible supports and extending in parallelism, one of the bars having curved seats, spring-retainers attached to the opposite bar and having their outer ends curved to coöperate with the curved seats, and clamping provisions having connection with the said bars, substantially as set forth for the purpose described.

20. In a machine for assorting and grading leaf-tobacco, the combination with a carrier, and trips, of a holder comprising a bar attached to the carrier, outwardly-extending parts applied to the bar at intervals in its length to admit of the said trips passing between them to engage with the leaf of tobacco and effect its release, and a bar having clamping-fingers to coöperate with the said outwardly-extending parts to grip the leaves of tobacco to be assorted, and movably related with respect to the first-mentioned bar, substantially as and for the purpose described.

In testimony that we claim the foregoing as our own we have hereto affixed our signatures in the presence of two witnesses.

JOHN M. GALE.
OSCAR A. GALE.

Witnesses:
BAYARD SHEPPARD,
JOE EHLERS.